United States Patent [19]
Scholten et al.

[11] 3,967,177
[45] June 29, 1976

[54] PHOTOCOMPOSITION MACHINE
[75] Inventors: Frank L. Scholten, Katonah, N.Y.; Ronald A. Kubinak, Edison, N.J.
[73] Assignee: Addressograph Multigraph Corporation, Cleveland, Ohio
[22] Filed: Nov. 14, 1974
[21] Appl. No.: 523,630

[52] U.S. Cl. ................ 318/603; 318/608; 354/10; 354/15
[51] Int. Cl.² ........... G05B 19/18; G05B 1/02; G03B 17/06
[58] Field of Search ............ 354/11, 14, 15, 16; 318/314, 608, 603

[56] References Cited
UNITED STATES PATENTS

| | | | |
|---|---|---|---|
| 3,590,705 | 6/1971 | Moyroud | 354/10 |
| 3,707,902 | 1/1973 | Purdy et al. | 354/15 |
| 3,721,165 | 3/1973 | Knoll | 354/15 |
| 3,754,452 | 8/1973 | Walstrom | 354/15 |
| 3,858,100 | 12/1974 | Bussi et al. | 318/314 |

Primary Examiner—Robert K. Schaefer
Assistant Examiner—John J. Feldhaus
Attorney, Agent, or Firm—Ray S. Pyle

[57] ABSTRACT

A system for intermixing large and small size type in a photocomposer by coordinating speed of a disc font storage medium with the size of type to be set. The speed of the disc drive motor is controlled by pulses of power to the motor. A signal frequency which is used to produce the pulses simultaneously controls the speed of the disc driven motor and a counter which is allowed to count out only at specified times in relation to the matrix relative position and thereby inform a controller of the matrix position.

4 Claims, 3 Drawing Figures

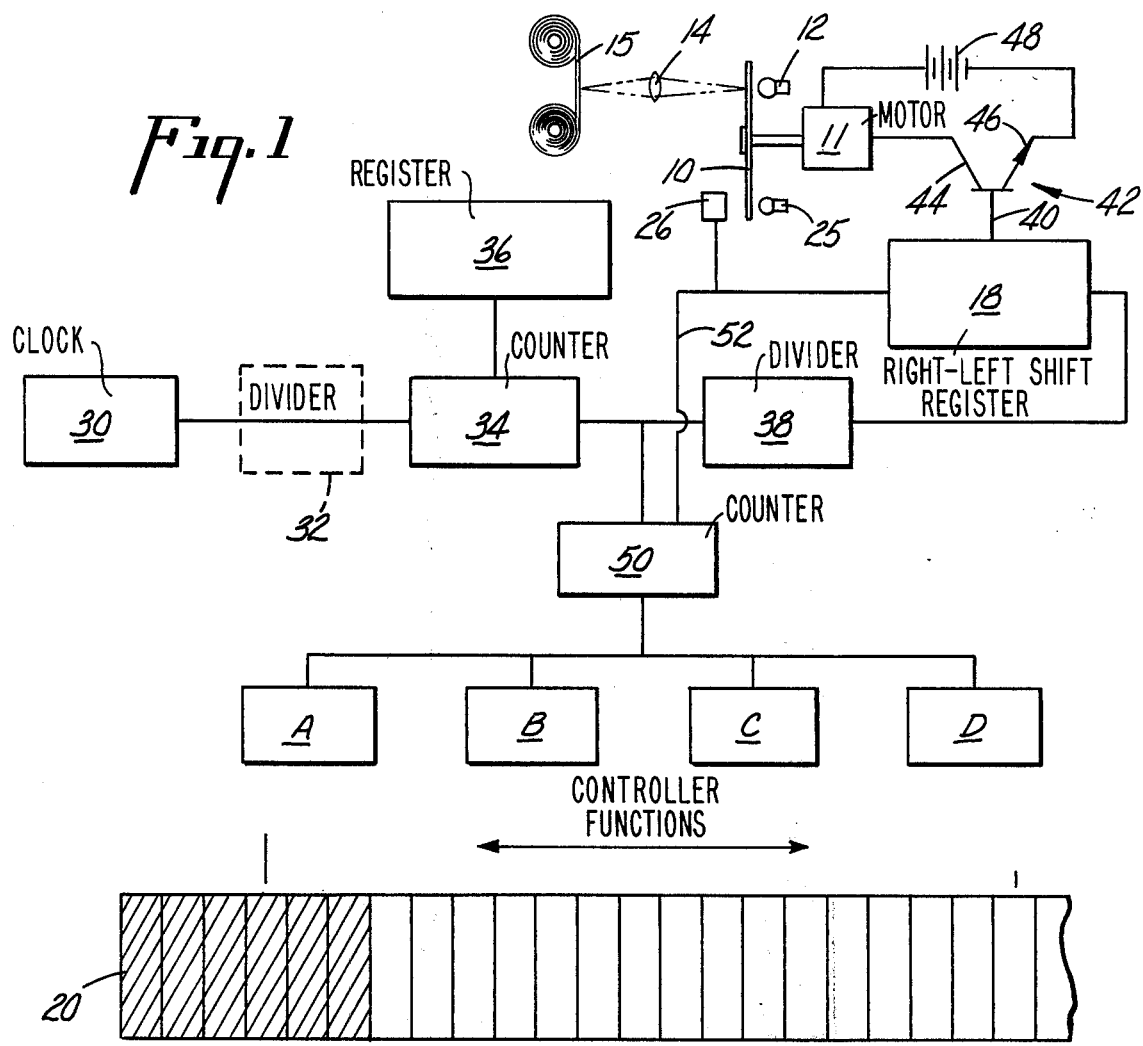
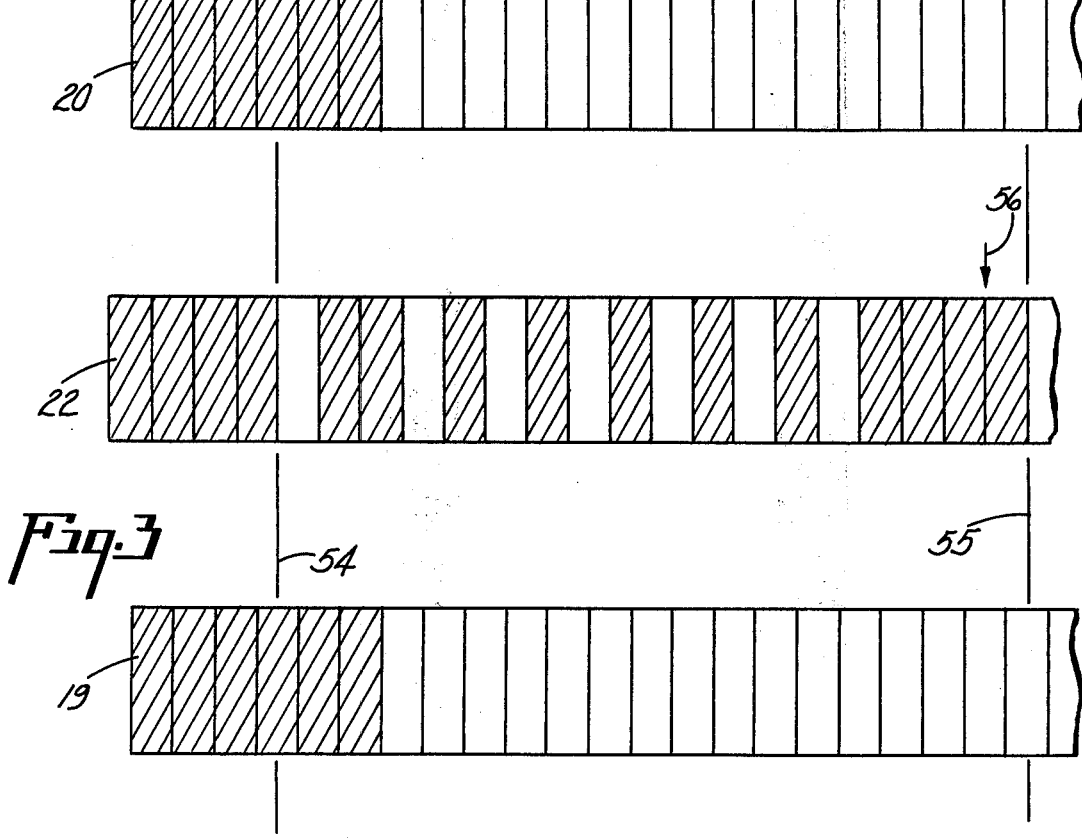

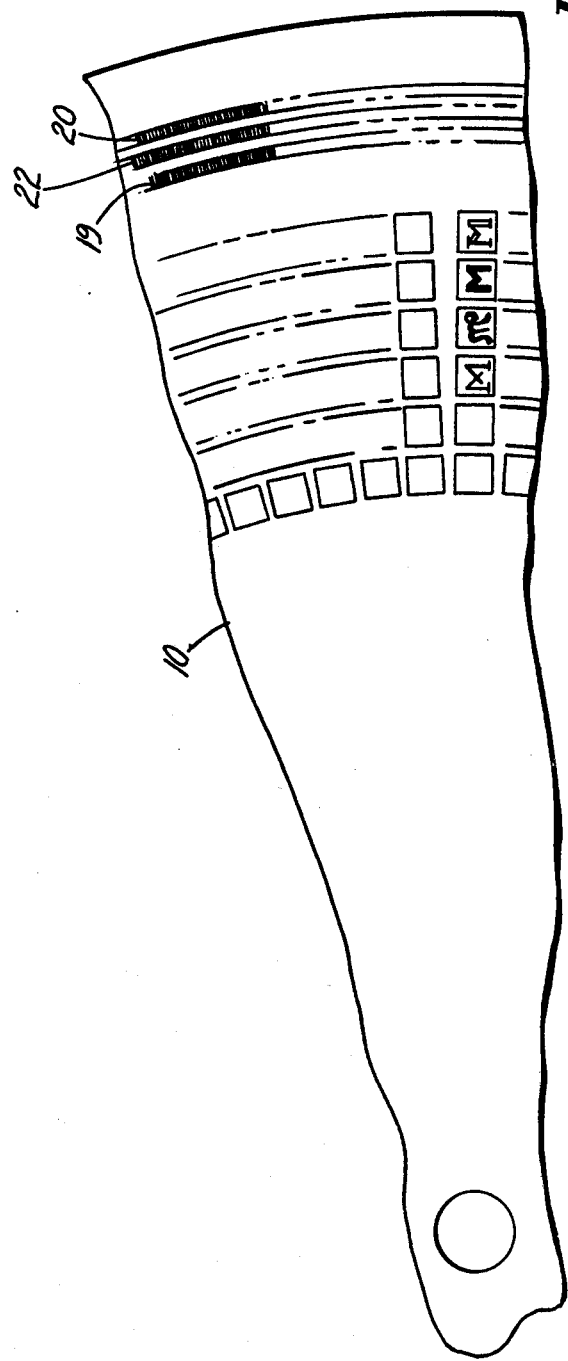

PHOTOCOMPOSITION MACHINE

BACKGROUND OF THE INVENTION

Photocomposition of text material has evolved and developed along various avenues, but the most popular and successful forms of photocomposition machines present a rotary font of alphanumeric subject matter in the form of a disc with the characters to be printed represented by transparent areas near the peripheral edge of the disc.

A separate series of alternate transparent and opaque areas provides the source for information to control the logic of the photocomposer in locating a desired character and focuses the image thereof on a plane where a photosensitive sheet is located.

Some photocomposing machines are capable of composing in only a relatively minor variation of size. More sophisticated, later-generation machines are now available which will provide various degrees of magnified images from the same character transparencies on the same disc. Therefore, it is possible to compose widely varying size images intermixed.

The usual prior art practice is to run the disc continuously but at a speed corresponding to the acceptable speed suitable for projecting the most magnified image, which is slow in comparison to relatively smaller magnification. Another approach is to use a stepper motor and bring each character to a halt for the required exposure time. The larger images require a slower speed because the movement of the disc is much more obvious in printed matter of large size. Perfect copy can only be obtained by a disc sitting in a stationery position, but the use of means to bring the disc to a halt slows the process unacceptably for normal commercial composition.

SUMMARY OF THE INVENTION

The problem which is solved by this invention is the control of the motor speed to produce intermixed letters of widely varying sizes in photocomposition, but to avoid complex logic circuitry which might otherwise be required to select and project the proper characters at the proper time whenever the speed of the matrix revolution is constantly changing.

It is an object of the invention to provide a programmable signal frequency which is used to simultaneously control the speed of the disc drive motor and measure the distance from a starting point to selected data on the disc, and to maintain this relationship for the various programmable speeds.

This invention provides a phase locked loop. A left shift-right shift register is stepped in one direction (right) by a frequency of pulses supplied by a series of alternate light transparent and opaque areas around a rotating matrix disc. Each pulse from the disc steps a low in the register in the direction to the right.

A regular clock pulse steps the register in the opposite direction, which shifts a high to the left.

An output from the register is either high or low, according to the relative condition of the register. The high output is used to control a power supply to a motor which drives the rotating matrix. It is a direct current motor, and will gain speed as long as power is supplied. Therefore, the speed is controlled by turning the power on and off at controlled intervals.

This structure results in an excess of clock pulses being stored in the register at start up. The motor then accelerates under full power. The resultant right shift pulses overtake the clock excess and step the register beyond the output. The power ceases and the clock pulses shift left. Soon an equilibrium is reached wherein the pulses are essentially phase locked.

In the application of the foregoing principle, there is an aberration in the actual operation in that the light transmitting and opaque section of the disc matrix which creates the pulses are not uniform. Therefore, the phase lock is an average rather than literal lock. Over the full cycle, the disc and clock pulses will be equal, and in a sense locked.

In this respect, this concept of phase locking is novel, because conventional phase locking will be completely frustrated if forced out of substantially exact locking for even a part of a cycle.

The preferred embodiment of a system to produce and utilize this concept will be set forth in the full description following.

DESCRIPTION OF THE DRAWINGS

FIG. 1 is a block diagram of the speed control circuitry and essential mechanical structure of a photocomposer machine to illustrate this invention.

FIG. 2 is a diagrammatic illustration of a portion of two data tracks, and one strobe track; and FIG. 3 is a diagrammatic illustration of a portion of the data and strobe tracks.

DESCRIPTION OF THE PREFERRED EMBODIMENT

In the drawing, FIG. 1 is a block diagram of components and their basic relationship needed to carry out the present invention. The components per se are not new, and are commercially available. It is the totality of the arrangement that is represented as being an advance in the art herein.

In the FIG. 1, a disc 10 is driven by a direct current motor 11. A light source 12 projects light through transparent characters in the otherwise opaque disc and the image of the characters is brought to focus by means of an optical system represented by the lens symbol 14. The image in light and shadow of a character on the disc 10 is then brought to focus on a photosensitive sheet 15. Except for a drive motor, an early patent illustrating such rotating disc and composition equipment is shown in U.S. Pat. No. 2,486,406. A more modern version is shown in U.S. No. 3,590,705 which teaches the availability of multiple font tracks and timing marks on a disc for greater selection of characters and location of those characters during composition.

The control of the motor speed in order to provide the correct disc rotation speed in relationship to the point size of the character being exposed, is accomplished by the provision of a shift register having an intermediate output tap which is either on or off according to the count that is put into the register is known as a four-bit right shift-left shift register, and is commercially known by the designation SN7495.

Regular pulses are created from a clock source and are used to drive the register in a first mode. Pulses generated by a strobe track on the disc are used to drive the register in a second mode opposed to the first mode. Hence, the register may be brought into balance where it will shift right or left in the vicinity of the output tap causing the tap to be on or off according to the balance of the register. The on or off condition of that tap may be used to control a power supply to a direct current motor. The shift register is indicated by the reference character 18 in FIG. 1.

In FIG. 2 that portion of a rotatable matrix disc needed for illustration of the present invention has been reproduced in fragmentary and enlarged size. In keeping with the modern practice of providing more than one font style on a disc, a series of blocks have been drawn representing the position available for six circular tracks of font. The particular font matrix is divided into 112 sectors for the provision of 36 upper case characters, 36 lower case, ten numbers special signs, symbols and punctuation marks. The provision of 112 sectors is not critical, but is a useful number to provide good flexibility of composition in any type style. There are six bands of such characters in the illustrated disc, but often these discs are made with three or four and as high as nine and ten font rows. The more font rows, the greater flexibility, but the greater the expense.

In the context of 112 characters in a font row, there is available 3.214° for the provision of data tracks such as the two data tracks 19 and 20 and the strobe track 22 illustrated in position in the FIG. 2, and illustrated in greater detail in the FIG. 3.

The data tracks 19 and 20 are important for the operation of the total machine, giving information such as the width code for particular characters. The illustrated track 22 in both FIGS. 2 and 3 is fragmentary and actually extends completely around the disc periphery. It is composed of alternate transmitting and opaque sections in this preferred embodiment, but any known response source sections around the matrix, which will effect a reading means and produce an output pulse signal series corresponding thereto will be acceptable.

In FIG. 1 a light source 25 and a sensor 26 are illustrated as a means to sense the light and dark sections of the strobe track 22. In the actual machine similar light and sensing devices are provided for the data tracks 19 and 20.

As the disc rotates, the sensor 26 will register light or the absence thereof and hence put out a series of signal pulses. As the dark portion, for example, comes into alignment between the light 25 and the sensor 26, the absence of a signal will be detected by the controller. Then, as the following transparent section comes into alignment between the source 25 and the sensor 26, there will be a transition to a positive signal. Then, and important to the understanding of this invention, each sector of strobe track 22 begins with four dark units in order that there will be no transition. Thereafter, a transparent bit provides a signal of availability for establishing the positional relationship of the character of the sector, in the event the controller is prepared to use that particular character. Then the balance of the 18-unit area consists of smaller units of dark and transparent sections. The signal output from the four-in-series dark unit followed by the shorter alternate sections is available for control purposes in the circuitry illustrated in FIG. 1.

The described track 22 will produce a wave-form frequency output from sensor 26, which may thereafter be squared and otherwise modified or used to control other components. Track 22 output will not produce a uniform frequency. The prior art devices which use regularly spaced transparent sections will produce a uniform frequency. This invention provides a means to keep a record of the output, whether regular or irregular, and to produce a locked following phase, at least on average.

Referring now to the block diagram portion of FIG. 1, a master clock 30 is composed of a crystal pulse generator. Such pulse generators are very commonly used for timing devices such for example, as precision instruments. Electric wristwatches are a common example. The crystal in the clock 30 has an output frequency far greater than the frequency needed for the purposes of this invention, and therefore a frequency divider is used to reduce the frequency into a useful range. A dotted outline component 32 is placed in the diagram on FIG. 1 to indicate the use of suitable frequency divider circuitry in the event a high frequency master clock srystal is employed with a range higher than useful. If a master clock of lower frequency is available, then it is not necessary to use a divider 32.

When a proper range frequency is established by means of the clock 30 and possibly a divider 32, that frequency is directed to a counter 34. Counter 34 is programmable by a program register 36. In the context of photocomposition, it is presumed that the programmable register 36 will be employed under the control of the master controller and software for the photocomposition machine, because it will be necessary to change the number in the counter 34 according to the dictates of the text being composed.

The control register 36 exerts its control influence upon the counter 34 and will determine the number of pulses which will enter the counter 34 before an output pulse is produced. In this way, the controller of the machine is able to dictate the frequency which is finally divided from the master clock and employed in the speed control of the motor 11.

The output from the counter 34 is applied to a frequency divider 38 and the output of the divider 38 is then applied to the input terminal of the four-bit right shift-left shift register 18. Accordingly, for each pulse that emanates from the divider 38, the shift register will count left one position.

Simultaneously with the production of a controlled frequency through the system described, the strobe track of the disc 10 is caused to produce a series of pulses from the alternately dark and light areas of track 22. These pulses are not totally uniform throughout the 18 units for each character, but the first four units, and the sixth and seventh units constitute a minor part of the entire periphery of the track throughout the 112 sectors, and therefore the imbalance due to these two units in each sector is compensated for.

The output pulses from the strobe track 22 are directed to an input terminal of the register 18 where they are used to step the register right in opposition to the left stepping caused from the frequency of output from divider 38.

Between the two extremes of the input to the register 18, a terminal 40 provides an output which will register on or off according to the momentary condition of the internal flip-flop structure established by the counterbalance of divider 38 and the strobe track 22 frequency. Terminal 40 is directed through an amplifier to the base of a transistor 42. The collector 44 of the transistor is connected to the coil of direct current motor 11 and the emitter 46 to ground. When the transistor 42 reacts to a signal on the terminal 40, it will become conductive and allow current from a power source 48 to pass through the coil of the motor and cause the motor to begin accelerating. When the shift register shifts right and the terminal 40 goes off, the transistor will become an off switch and prevent passage of current to the motor 11 and the motor will begin to decelerate. Thus, the motor will be controllable in speed by a balance between off and on conditions.

As the motor 11 is energized the disc 10 rotates at a greater speed, and conversely the disc 10 is slowed when the motor does not receive power. As the disc 10 increases in speed the frequency from the strobe track sensor 26 will be greater and the shift register 18 will tend to shift right against the uniform input of the frequency divider 38. Thus the frequency from the strobe track will cause motor acceleration until the terminal 40 becomes a digital "0" and then the disc will slow again. Hence, the shift register 18 is sensitive to the speed of the disc and will increase the speed and decrease the speed of motor 11 by minute bursts of power interspersed by coasting in order to maintain essentially a steady speed.

Also, it should be re-emphasized that the speed that the disc will attain is a direct function of the input frequency to the register 18 and that that input is controlled by the setting of control register 36. A computer program may therefore be written which will indicate to the photocomposer the particular size character that is to be projected and to coordinate the disc speed accordingly. That program will then cause a larger number to be imposed upon the counter 34 for larger characters and will cause a slowing of the frequency of the output terminal 40 and the shift register 18.

The structure thus far described is set forth and claimed in co-pending application Ser. No. 485,342 filed July 3, 1974.

In standard practice, using timing marks of uniform size and spacing around a disc periphery, the motor speed is constant and the pulses generated by the timing marks occur at a precise regular interval. Therefore, RC circuits are designed to count the pulses and by insertion of one oversize transparent area the controller is able to track the character location at all times.

If the disc speed is not constant, then counting is more complex. Each RC circuit would have to be changed for each speed change as one example.

The counting function is only one problem in the overall concept of this invention that is not feasible with prior art timing mark technology. It is a part of this concept to provide all character information from the disc, rather than a stored memory of the controller. Therefore, disc speed variation is unacceptable with known access control systems.

In this invention the location of data on the disc 10 is accomplished by means of a pulse counter 50 which is a counter equivalent to the counter 34. Counter 50 is connected to the output of counter 34 and therefore begins to count until filled and then gives off an output pulse. In the particular illustration, the counter 50 is a divide-by-sixteen counter and thus will require 16 input pulses before an output pulse is generated.

Counter 34 is a divide-by-ten counter and therefore the ratio between counters 38 and 50 approaches two to one. The strobe track 22 is not uniform. There are 18 division, but the first four are all opaque, and the sixth and seventh are opaque. Therefore the pulses generated by the strobe track through the sensor 26 will be somewhat fewer in number than 18 uniform alternate sections would produce. By providing the divider 38 as a divide-by-ten counter, the rate of the step-left mode due to the clock source is slowed to substantially match that which would be produced by the strobe track if the sections were uniform. The four adjacent dark sections of track 22, which produce no pulses, have the effect of increasing the motor speed because of the reduction in pulse numbers supplied to the counter 18. The divide-by-ten counter 38 has the same effect upon the uniform clock source, and hence a substantial balance is obtained.

This invention is a unique advance in the art over the use of a constantly rotating disc which employs regular timing marks plus a larger transparent area. The prior art has adopted such practice in order to count the location of the disc and thereby enable the controller to count from a starting point to a particular letter or character that is to be flashed. Since this invention is incorporated into the concept of a changing motor speed in order to provide for harmony between character size and disc speed, the known circuitry for counting from an origin is not suitable. This invention incorporates a relationship between counters 38 and 50 to produce a pulse which is characteristic of a starting point on the disc in a unique manner, and also to produce a series of 112 pulses related to the four contiguous dark areas at the beginning of each of the 18-unit division in each of the 112 sectors.

The frequency output from the divider 34 is not only supplied to the counter 38 but also to the counter 50. Whereas it takes ten pulses into counter 38 to produce an output, it requires 16 input pulses to produce an output pulse from the counter 50. These divide numbers are chosen arbitrarily to match the particular 112 section division of the disc further divided into 18 subdivision units, and must be adjusted for other selections of character spacing. The intention, however, is that the ability of the counter 50 to produce an output pulse is related to the configuration of the strobe track 22.

In order to accomplish a recognizable signal, related to the strobe track, the first four units of the 18-unit division are contiguous dark units. Therefore, during these four units the sensor 26 does not produce an output signal. A line 52 from the output of the sensor 26 is connected to the reset terminal of the counter 50. Accordingly, each time there is an output signal from the sensor 26, the counter 50 will stop and begin counting anew. During the regular division of the eighteen sectors of each character, the time elapsed between transition from a dark to a light area is such that the frequency from the counter 34 supplied to the counter 50 is low enough that the 16 necessary input pulses cannot be obtained prior to the counter 50 receiving a pulse from the sensor 26 through the line 52. Therefore, the counter 50 does not produce an output pulse.

When the contiguous first four sectors are passing the sensor 26, however, and no reset pulse is received for the four units of time, there is sufficient time for the counter 50 to fill and put out a pulse.

The result of this relationship is that 112 times for each revolution of the disc, regardless of what speed that disc is travelling, there will be no output from the counter 50 except at the beginning of each of the 18 subdivisions where the four contiguous dark areas exist.

The functions may be visualized better perhaps if the track in FIG. 3 may be considered to become smaller with a faster speed of the disc and stretched larger under slower speed. Visualizing in that manner, it will be recognized that if the output of the counter 34 to the counter 50 were uniform during the period when the motor were slowed, then a pulse would be produced far to the left of the four contiguous units, and conversely if the motor were speeded it could be possible that the pulse would appear after the four contiguous units.

This invention is uniquely adapted to prevent such misplacement of the pulse and to produce the pulse within the four contiguous units because the output of the counter 34 is directed to both the counter 38 and the counter 50. Hence, if the motor is slowed by reducing the input to counter 38, then the output pulses from the counter 50 are slowed with relationship to the imaginary enlargement of the track 22 to place the pulse about at the end of the third unit of the four contiguous units. Then, if the frequency from the counter 34 is increased, and consequently the speed of the motor increased, the output pulses from counter 50 will come more frequently and hence move to the left in the four contiguous units, but in view of the fact that the track is moving faster, and the imaginary track is reduced in length, the pulse comes essentially at the same arbitrarily chosen position, which is about the end of the third unit.

In the light of the foregoing discussion, it will be recognized that the pulse produced by the counter 50 will always stay substantially in the same location with respect to time within the four contiguous units. Hence, the output from the counter 50 may be sensed by the controller, which is figuratively represented in FIG. 1 by four blocks A, B, C, and D. These are purely arbitrary symbols representative of control functions within a controller. The block A, for example, may be considered to be the control function programmed to sense the pulse from the counter 50 and indicate to the controller that a character is approaching the alignment with the lens 14, and may be projected if that particular character is the selected character. Then, when the fifth unit of track 22 passes the sensor 26, and produces a pulse, that pulse may fire the light source 12 and produce an image.

However, it is necessary to know which character is coming up to the projection position in order for the controller to know whether that particular flash bit is to be enabled to activate the light source 12.

In place of the uniform speed disc with its one clear area for resetting the counter in standard practice, this invention employs a unique interrelationship between data tracks and the strobe track. In FIG. 3 a line has been drawn through the three tracks 19, 20 and 22 which is represented by reference character 54. Another line 18 units away is given the reference character 55. If these lines were literally placed upon the disc, there would be 112 such radial lines representing the 112 sectors. Line 54 represents the last, or the 112th character set line. Line 55 represents the zero or first character set line. Note that there are six dark units straddling the line 54 and that these six units are opposite the four contiguous units of strobe track 22. Hence, when the pulse is sensed from the counter 50 at about the third position of the contiguous four in the track 22, the sensors for the data tracks 19 and 20 will not be receiving a pulse. However, the opposite condition exists at one point only in the disc, and that is the area straddling the line 55. When the pulse is produced by the counter 50 at the location indicated by an arrow, given a reference character 56 in FIG. 3, the two data track sensors for the tracks 19 and 20 will be receiving a pulse. Hence, one time only for each revolution, the controller will be given a starting reference which exactly matches the beginning of the complete circle of characters regardless of the speed of rotation of the disc.

Thereafter, the controller is able to be informed by the pulse from the counter 50 of the passing of one sector and the beginning of another regardless of speed change. Counting by the conventional RC circuits of the prior art will not function if the speed varies.

Also, unique to this invention, as a result of the physical structure described, is the capability of the operator to select a particular character, and upon the disc rotating to the position wherein the flash bit unit five, in the 18 series for that particular character is sent, the portion of the controller, for instance section B, may then direct the units six through eighteen of the strobe track to count out to a position indicating the selection of the particular font that is to be used in the composition, and to select and read data from data track A and data track B respecting that particular character for such things as the width that the character is to occupy on the page at the particular point size selected as well as other information. This information may then be stored in another section of the controller, for example, sector C, and the actual exposure of the character delayed to a further time. Such selection of font and information is made by the operator until a column line is completed, and thereafter the controller, for example, the section D of the controller, will then calculate the word spaces and the total line space occupied by characters, and determine the amount of expansion of the word spaces, and perhaps the letter spacing as well, to exactly justify the line to the column length selected. Then, the controller on the next revolution which senses the flash bit unit five for that particular character, will again be able to read the information from the data tracks to establish escapement distance of the lens system 14 and also to flash the character. Thus, the new and improved device set forth herein greatly simplifies the complexity of the controller by making unnecessary the storage of a complete program in a large memory bank. Only a reasonable size memory is needed to process a line or a few lines at a time, accessing the information on the disc rather than stored memory.

What is claimed is:

1. A photocomposition machine having a variable speed character matrix for coordinating exposure time of a character to print size requirements, comprising:
   a master clock of regular pulse frequency;
   a strobe track on said matrix divided into a series of sectors, one for each character on said matrix and, each sector subdivided into a series of alternate sensable areas;
   a sensor means for detecting said areas and producing a series of pulses representing the type and extent of each sensable area, the rapidity representing motor speed and the duration of each pulse representing the unit space of said areas;
   a left shift--right shift register;
   an input from said clock connected to drive said shift register to count in a first mode;
   an input from said sensor means connected to drive said shift register to count in a second mode opposed to said first mode;
   an output from said shift register responsive to the toggled condition within said shift register for producing either a high or low signal;

a power supply responsive to said output of the shift register for applying power to said motor only when said output is at one of said two possible levels, whereby the motor speed is controlled by power pulses;

at least one data track on said matrix divided into a series of sectors, one for each character on said matrix, each sector having a pattern of sensable areas representing digital information pertaining to the character;

a counting register;

an input circuit from said clock to said counting register;

a reset circuit from said strobe sensor to said counting register;

said strobe track sectors each having one said subdivision of greater extent than the others to produce a long time period of no pulse from said sensor and thereby a delayed reset signal;

said clock input circuit and reset circuit balanced to allow said counting register to fill and produce an output pulse only during the time period of said delayed reset signal; and controller means for acting according to a program to relate the position of said output pulse to the character data track and thereby select data representative of a chosen character for performing photocomposition functions responsive to said output signal.

2. A photocomposition machine as defined in claim 1 wherein said data track has a section area radially aligned with said subdivision of greater length in said strobe track, one of which differs in sensor response from all others, whereby said controller means is informed of the coincidence of an output pulse from said counting register and said different data track area and applies that information as a starting point in a character location count, and uses the output pulse from each strobe track sector creation to signal the beginning of a character sector, whereby the starting count will identify which character is sought, and the strobe pulse will control the time of specific data input from the matrix including flash exposure of the character.

3. A photocomposition machine having:

a rotating matrix of impression characters arranged in character sectors, said matrix having a data track and a strobe track in a positioned relationship to said character sectors;

said strobe track being a variable pattern of indicia recurring at regular intervals, one interval representing one character sector of the matrix;

said data track having a set pattern of data areas containing digital information pertaining to a designated character of said matrix;

means to sense the strobe track and produce an output of pulses representing the pattern of indicia thereon;

a counting register and a regular clock pulse source driving said counter;

a circuit from said means to sense the strobe track connected to reset the counting register on change of the sensing means state, said pattern of indicia on said strobe track extended in length in one area in each sector to cause a delay of said reset signal for a period of time greater than the time required for said clock pulse to fill said counter, thereby allowing an output pulse from said counter to represent a positional relationship of said matrix; and controller means for acting according to a program to relate the position of said output pulse to the character data track and thereby select data representative of a chosen character for performing photocomposition functions responsive to said output signal.

4. A photocomposition machine having a variable speed character matrix for coordinating exposure time of a character to print size requirements, comprising:

a master clock of regular pulse frequency;

at least one data track on said matrix divided into a series of sectors, one for each character on said matrix, each sector having a subdivision pattern of sensable areas representing digital information pertaining to the character;

a counting register;

an input circuit from said clock to said counting register;

a reset circuit from said strobe sensor to said counting register;

said data track sectors each having one said subdivision of greater extent than the others to produce a long time period of no pulse from said sensor in comparison to the pulses from the other division, said counting register being reset upon each pulse, and said long period serving to designate the next following pulse or a delayed reset signal;

said clock input circuit and reset circuit balanced to allow said counting register to fill and produce an output pulse only during the time period of said delayed reset signal; and controller means for acting according to a program to relate the position of said output pulse to the character data track and thereby select data representative of a chosen character for performing photocomposition functions responsive to said output signal.

* * * * *